B. C. Hoyt.
Revolving Moldboard.
No. 184. R. I. Patented Jan. 5, 1858.
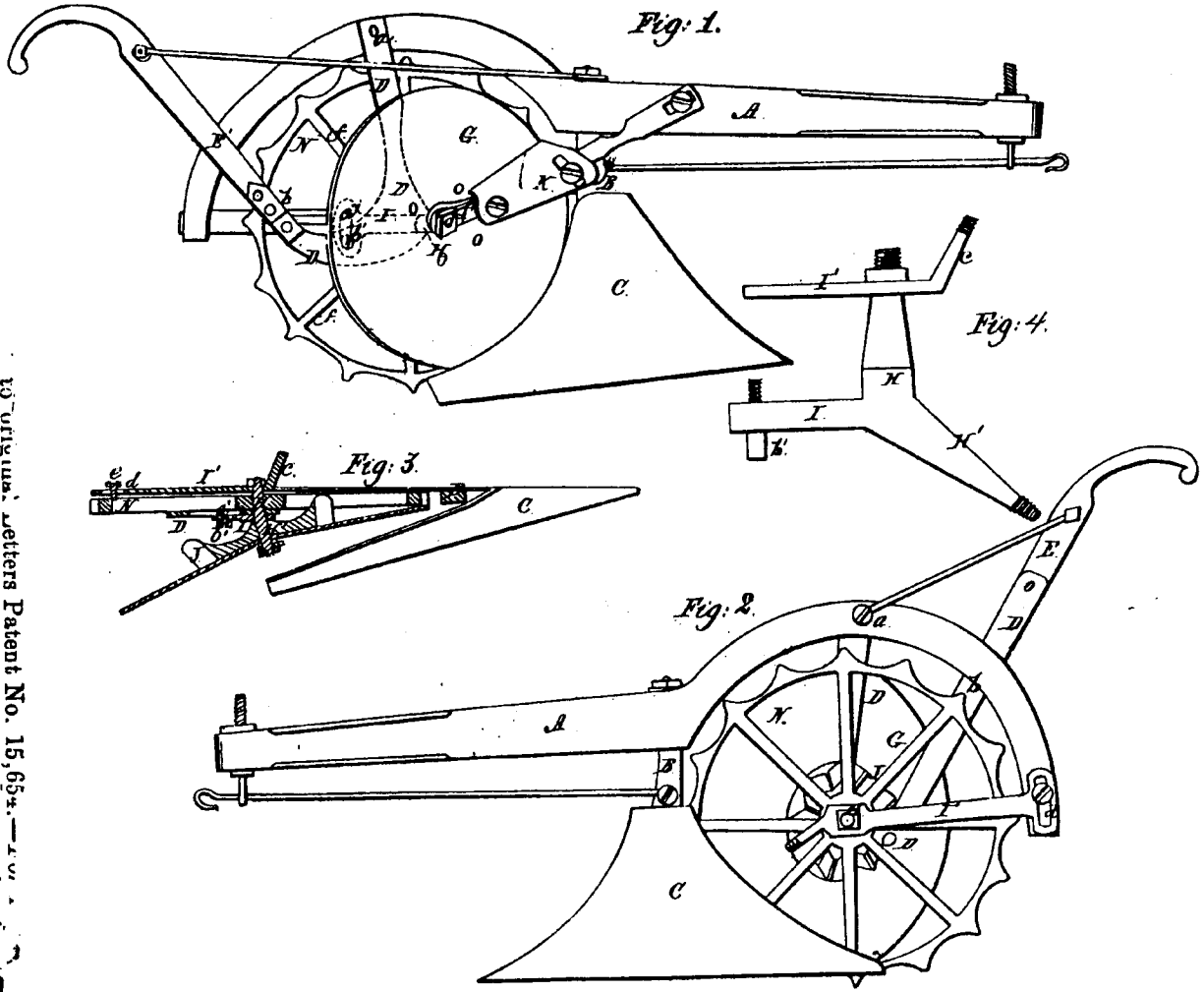
to original Letters Patent No. 15,654.— [illegible]
[illegible] *ughs.*—I claim the adjustable axle H, with angular journals [illegible] H¹, and adjusting arm [illegible] I I¹, in combination with the stirrup or standard D, rotary mould-board G, and ground propelling or driving wheel N, as and for the purpose herein set forth.
B. C. Hoyt.

DEPARTMENT OF COMMERCE
UNITED STATES PATENT AND TRADEMARK OFFICE

---

MISSING PAGE(S)

PATENT NUMBER AI 184 FOR THE ISSUE DATE 01/05/1858 HAS BEEN SCANNED/LOADED, BUT WITH MISSING PAGES(S). UPON RECEIPT OF THE MISSING PAGE(S), THE ENTIRE DOCUMENT WILL BE RESCANNED.

THIS NOTICE IS FOR THE MISSING PAGE(S) CONTAINING:

All Text